Patented Feb. 24, 1948

2,436,778

UNITED STATES PATENT OFFICE 2,436,778

PROCESS FOR PREPARING ALUMINA

Henry A. Pray and Charles L. Faust, Columbus, Ohio, and Frederic C. Jelen, Syracuse, N. Y., assignors, by mesne assignments, to Reconstruction Finance Corporation, a corporation of the United States No Drawing. Application May 10, 1945, Serial No. 593,098

7 Claims. (Cl. 23—142)

This invention relates to a process for obtaining alumina and, more particularly, to a thermal method for obtaining alumina for alum.

In certain processes, alumina is required to be substantially free from potassium. One such process is the manufacture of metallic aluminum wherein alumina is charged into electrolytic reduction cells. Because of the harmful effect of even small amounts of potassium on the lining of the reduction cell, the potassium content of the alumina must be reduced to a minimum.

Although alumina manufactured from bauxite by the well-known Bayer process is satisfactory for this purpose, the great expansion in the aluminum industry under the present war program and the uncertainty with which the import supply of bauxite to this country can be maintained have brought about a search for additional sources of alumina within the United States.

Certain alumina-bearing clays and tailings from ores principally treated for other metals contain substantial amounts of alumina but in forms that cannot be recovered economically in sufficient purity by the Bayer process. A standard procedure for recovery of this alumina is to convert the crude alumina-bearing material into an alum by digesting it with sulfuric acid and adding a required amount of an alkali-metal sulfate or ammonium sulfate. Since the alumina-bearing ores, tailings, clays, etc., of the type in question usually contain appreciable amounts of potassium, alum derived from them will consist, in part at least, of a potassium alum.

The two principal methods for obtaining alumina from alum may be designated generally as a precipitation process and a thermal decomposition process.

The precipitation step in recovering alumina consists essentially of dissolving the alum in water and treating the solution to precipitate aluminum hydroxide. This usually comes down as a fluffy, gelatinous mass that adsorbs other ions from the solution. When potassium is present, the potassium ions are particularly and undesirably adsorbed by the aluminum hydroxide precipitate and cannot be entirely removed by simple filtration and washing. Moreover, the gelatinous nature of the precipitate makes filtering and washing difficult. The tendency of the precipitate to adsorb ions causes alumina recovered by drying the aluminum hydroxide precipitate to be excessively contaminated with potassium, so that it is not commercially feasible to use such alumina in current electrolytic reduction cells.

The thermal process for making alumina from alum comprises heating the alum to an elevated temperature, such as 1650° to 1850° F., in order to decompose the alum and to obtain a mixture consisting of alumina and sodium and/or potassium sulfate in a ratio depending on their respective amounts in the alum. By aqueous extraction the sulfates can be dissolved out, leaving the alumina sufficiently low in soda and sulfate, but not sufficiently low in potassium, for use in current electrolytic reduction cells or similar uses requiring low potassium content.

A suitably low potassium content of the alumina produced by controlled thermal decomposition can be achieved by further calcining it at a much higher temperature level of 2700° to 3000° F., but commercial operation on a large scale at these temperatures presents severe problems concerning materials of construction and heat consumption and is relatively costly.

An object of this invention, therefore, is to provide a new and improved method for obtaining alumina from alum and, more particularly, to provide a new and improved thermal method for reducing the potassium content of alumina derived from alum containing potassium either as component or as impurity.

A further object of this invention is to provide a method for thermally decomposing alum which permits considerable latitude of heat control.

Yet another object of this invention is to provide a method for minimizing or eliminating potassium from alumina derived from alumina-bearing clays and ores treated principally for other metallic values.

Other objects and advantages of this invention will become apparent from the following detailed description thereof.

In general, the invention comprises calcining an alum in the presence of a water-soluble inorganic sodium salt.

It is to be understood that the invention is not limited in its application to the specific process herein set forth, since the invention is capable of other embodiments and of being practiced or carried out in various ways. Also, it is to be understood that the phraseology or terminology employed herein is for the purpose of description and not of limitation.

The thermal decomposition of alum is a diffusion-controlled process. It depends on the temperature of decomposition, the length of time at decomposition temperature, ventilation in the furnace, and the physical nature of the dehydrated alum. All of these factors are closely interdependent and potassium contamination of the alumina relates to all of them. Preheating is also a very critical part of the calcining operation. Incipient fusion of the charge during preheating of the alum is to be avoided, since that causes incomplete calcination even though the otherwise optimum temperature is maintained during calcination. Potassium contamination of the alum product may be kept down by using a furnace charge of granular dehydrated alum and by providing suitable ventilation.

It has been found that calcining the dehydrated alum for a time longer than the optimum period required to give complete decomposition at a given temperature contributes to excessive potassium contamination of the final product. Apparently the excess contamination arises from some solid phase inter-action between the aluminum oxide and potassium as sulfate at high temperatures.

It has been discovered that by calcining the alum in the presence of certain water-soluble inorganic sodium salts the time that the alum is held at the calcining temperature is made less critical and that a lower potassium contamination also results.

In one application of the invention, an alum is calcined to produce alumina, and the alumina so obtained is powdered and mixed in the dry state with a water-soluble inorganic sodium salt. When this mixture is calcined, the resulting alumina contains substantially less potassium than does the alumina resulting from corresponding calcination of the original alum.

The following Table 1 indicates some of the sodium salts that have been used satisfactorily in this process.

Table 1

| Salt | Per cent Salt Added to Alumina [1] | Calcination Temperature, °C. | Period Held at Calcination Temperature, Hrs. | Per cent $K_2O$ Content of Resulting Alumina |
|---|---|---|---|---|
| None | 0 | 1,350 | 2 | 0.6 |
| Sodium chloride | 3 | 1,350 | 2 | .07 |
| Sodium borate | 2 | 1,350 | 2 | .04 |
| Sodium fluoride | 2 | 1,350 | 2 | 0.2 |
| Trisodium phosphate | 4 | 1,350 | 2 | 0.3 |

[1] This alumina contained 0.7 per cent $K_2O$ by weight.

This process as above-described is somewhat disadvantageous in that it requires a double calcination, and thus increases the complexity of purification of the alumina.

A preferred embodiment of this invention comprises introducing a water-soluble inorganic sodium salt into molten alum during its initial dehydration. The normal alum melts at a temperature of about 200° F. and forms a melt in which the sodium salt can be dissolved or uniformly dispersed. Heating of the molten alum is continued to drive out water and a stage is reached where the melt becomes syrupy and obtains a surface crust under which steam forms from water discharged from the alum. The steam thus formed causes bubbling, blowing, and puffing-up to expand the alum to exceed the confines of the dehydrating kettle. If desired, dehydrated alum may be added as seeds to the molten normal alum to prevent this tumescent effect in the later stages of dehydration of the melt. The seeds cause uniform slow boiling during the evolution of the water.

When the mass is about 20% dehydrated, it is allowed to solidfy and is later broken up for charging into calcining furnaces. Dehydration of the alum by the use of seeds is not an indispensible element of the present invention, but does aid in its practical application.

In practicing the preferred embodiment of this invention, it is desirable that the seeds, which are added to produce desired dehydration effects, should also contain sodium salt in the same sodium to alumina ratio as is used for the addition of the sodium salt to the alum. The alum-sodium salt seeds are made by heating a quantity of the alum hydrate to just above its melting point to produce a homogeneous melt of low viscosity, and a suitable water-soluble inorganic sodium salt is then stirred into the melt until it is completely dissolved or dispersed. The amount of salt to be added is dependent on the type of salt used and on the nature of the alum to be calcined, but between about 1% and about 15% by weight of the alumina in the alum hydrate has proven satisfactory for most cases. The upper limit of the salt addition is determined by the fusion characteristics of the salt, while the lower limit must be determined empirically for each salt.

Table 2 shows various amounts of sodium chloride and sodium sulfate added to 1000 grams of normal potassium alum to produce alum-sodium salt seeds in the manner above described.

Table 2

| Alum-Salt Seed Stock No. | Sodium Salt | Grams of Sodium Salt per 1000 Grams Alum |
|---|---|---|
| 1 | Sodium sulfate | 1.08 |
| 2 | do | 5.40 |
| 3 | do | 27.00 |
| 4 | Sodium chloride | 0.89 |
| 5 | do | 4.45 |
| 6 | do | 22.2 |

The alum melt containing the salt is heated to evaporate water in order to thicken the melt, which is then poured onto slabs of some suitable nonreacting material. When cold and solidified, the alum casting is broken up into small lumps of approximately ½-inch size, which are then dried to complete the dehydration. After drying, the substantially anhydrous stock is ground to about −20-mesh size to provide alum-sodium salt seeds.

After the alum-sodium salt seeds have been prepared, another quantity of the alum hydrate is heated to form a melt and a water-soluble inorganic sodium salt is dissolved or dispersed therein. A suitable quantity, generally about 10% to 30% by weight of the alum, of the alum-sodium salt seeds previously prepared is then added to the alum melt to prevent frothing, bumping, and puffing during evaporation of the water therefrom, much the same as chips of porcelain are added to ordinary solutions which are to be boiled or reduced by evaporation. Since these seeds are not dissolved in the alum melt, it is highly desirable that they contain the same percentage of sodium salt as the alum melt to which they are added in order that a homogeneous product will result. As a practical matter, the same sodium salt is usually used in the production of the seeds as is added to the alum melt, although a different salt may be used.

The melt, with the alum-sodium salt seeds added, is stirred until it becomes pasty and then is poured out onto non-reacting slabs similar to those described above in order to cool. The alum casting thus formed is broken up into lumps which are dried in a forced draft furnace to complete the dehydration.

The dehydrated lumps are screened, preferably to between about ¼ inch and about ½ inch in size, and calcined at an elevated temperature. The calcined products are freed from all soluble matter by leaching with boiling water. Alumina obtained by this process may contain as little as .20% potassium oxide as evidenced by Table 3.

*Table 3*

| Test No. | Salt Added | Grams of Sodium Salt Added | Alum-Sodium Salt Seed Grams added to 1000 Grams of Alum Melt | Stock No. (Table 2) | Per cent $K_2O$ in Alumina |
|---|---|---|---|---|---|
| 1 | Sodium sulfate. | 1.08 | 285 | 1 | 0.2 |
| 2 | ....do........ | 5.40 | 285 | 2 | 0.25 |
| 3 | ....do........ | 27.00 | 285 | 3 | 0.2 |
| 4 | Sodium chloride. | 0.89 | 285 | 4 | 0.3 |
| 5 | ....do........ | 4.45 | 285 | 4 | 0.35 |
| 6 | ....do........ | 22.2 | 285 | 6 | (¹) |
| 7 | None......... | 0 | 0 | | 0.7 |

¹ Charge fused.

The data tabulated in Table 3 indicate that about 1% by weight of sodium chloride or sodium sulfate of the alum, based on the alumina content of the alum may be taken as an optimum amount. The data further show that a smaller amount than 22 grams of sodium chloride per 1000 grams of alum hydrate must be added in order to avoid fusion during calcination.

In the practical application of the preferred embodiment of this invention, no special step for producing alum-sodium salt seeds is involved, because the seeds are obtained by setting aside about 10% or so of each batch of dehydrated alum just before it is to be calcined.

In order to further enable one skilled in the art to practice this invention, the following specific example is outlined:

Alum-sodium salt seeds are prepared by heating 1000 grams of normal potassium alum $(K_2SO_4.Al_2(SO_4)_3.24H_2O)$ and adding thereto 1.08 grams of sodium sulfate with a slight amount of stirring. When the salt has completely dissolved in the melt, the melt is heated to evaporate sufficient water to thicken it to a paste, and it is then poured onto flat nonreacting slabs to cool. The cold and solidified alum-sodium salt casting is broken up into ½-inch lumps which are dried for 2 hours at 200° C. in a forced draft furnace. The dried stock is ground to —20-mesh size to provide the alum-sodium salt seed stock.

Another 1000 grams of normal potassium alum is then heated to form a melt and 1.08 grams of sodium sulfate is dissolved therein by stirring. Next, 285 grams of the previously prepared alum-sodium salt seeds is added to the alum-sodium salt melt to prevent frothing and puffing. The melt is stirred until it has reached a pasty viscosity, at which point it is poured out to cool on flat nonreacting slabs. Following solidification of the alum melt, the casting thus produced is broken up into ½-inch lumps which are dried at 200° C. for 2 hours in a forced draft furnace to complete the dehydration. The dried lumps are screened to between ¼ inch and ½ inch in size and then calcined for a period of 1 hour at 1000° C.

All soluble products of the calcination process are removed from the calcined material by leaching in four successive batch treatments of boiling water. Alumina was obtained by this process which contained 0.2% potassium oxide. A blank test run in the same manner on the same alum, but in which no inorganic sodium salt was added, produced an alumina containing 0.7% potassium oxide.

The reaction by which the inorganic sodium salt prevents potassium contamination to a degree that is beneficial is not clearly understood, but it is thought to be effected by a displacement of potassium by action of sodium, thus preventing the solid phase, high temperature reaction between the potassium sulfate and the alumina.

It is thought that the intimacy of the mixture of the potassium sulfate and the alumina during calcination of the normal partially dehydrated potassium alum might account for the formation of a stable potassium compound that stays with the alumina throughout the leaching. To check this possibility, hydrated aluminum sulfate was melted with a little water and potassium sulfate was added to two samples thereof to provide the following percentages of potassium on the basis of the weight of the alumina: 10.2% and 1.5% potassium, respectively (normal potassium alum contains 8.2% potassium on the same basis). The samples of the alum melts were cast, broken into lumps, sized to between ¼-inch and ½-inch, dried at 200° C., and calcined 1 hour at 1000° C. The calcined products were leached in water in the usual manner and the potassium oxide content of the alumina obtained therefrom was 0.5% and 0.4%, respectively, which is in line with the results obtained with the normal potassium alum and indicates the intimacy of bonding in the alum has little effect on the formation of the stable potassium compound.

While intimate mixture of the sodium salt and the alum is believed to be desirable, a reduction of the potassium content of the alumina will still result when the salt and the contaminated material are not thoroughly mixed, but are merely mixed in the dry powdered form as in the first embodiment of the invention above described involving double calcination of the alum.

Mixed ammonium potassium alums, in which the ammonium potassium ratio varies from 1:4 to 4:1, yielded alumina of substantially the same potassium oxide content. This indicates that the percentage of potassium in the alum is not determinative of the potassium content of the resulting alumina.

Hence, neither the intimacy of the mixture nor the ratio of the potassium and aluminum salts in the alum directly affects the potassium contamination of the resulting alumina.

Various water-soluble sodium salts may be used, or mixtures thereof to obtain benefits of this invention. Variations in the efficacy of different sodium salts in reducing the potassium oxide contamination of the alumina apparently arises from differences in the thermal properties of the salts.

It is apparent from the above description that the invention comprises a new and improved method for obtaining alumina from potassium alums. Sodium sulfate, sodium chloride, sodium borate, trisodium phosphate, or sodium fluoride are given as examples, but not as restriction. About 2% sodium borate or about 4% sodium phosphate illustrate suitable quantities. Through the utilization of this method, material reduction of the potassium content of the alumina resulting from the calcination of the alum is effected as well as reduction in the exactness of the thermal control required during calcination.

This invention has been principally described with reference to normal potassium alum, but it is applicable to other potassium alums, such as mixed ammonium potassium alums. The term "alum" as used in the specification and the appended claims, is limited to aluminum alums.

The objectives of this invention may be achieved whether or not the sodium salt is added before or after dehydration, although the former is preferable.

Variations and modifications of the invention as hereinabove set forth will become apparent to those skilled in the art, and such changes as may be made without departing from the spirit of the invention as defined in the appended claims are to be included as part of this invention.

What I claim is:

1. A method for obtaining alumina from aluminum sulfate containing potassium, which includes forming a melt of the sulfate, dispersing sodium sulfate in the alum melt, dehydrating the mixture thus formed, calcining the dehydrated product to a point short of incipient fusion to form alumina, and leaching the calcined product with water to render the resulting alumina free from soluble matter.

2. A method for obtaining alumina from a potassium alum, which includes forming a melt of the alum, dispersing sodium borate in the alum melt, dehydrating the mixture thus formed, calcining the dehydrated product to a point short of incipient fusion to form alumina, and leaching the calcined product with water to render the resulting alumina free from soluble matter.

3. A method for obtaining alumina from a potassium alum, which includes forming a melt of the alum hydrate, dispersing a water-soluble inorganic sodium salt in the alum melt, adding thereto substantially anhydrous seeds of a solidified melt comprising a mixture of alum and water-soluble inorganic sodium salt, said seeds containing sodium salt in the same ratio of sodium to the alum as the melt to which they are added, dehydrating the mixture thus formed, and calcining the dehydrated product to a point short of incipient fusion to form alumina.

4. A method for obtaining alumina from a potassium alum, which includes forming a melt of the alum hydrate, dispersing sodium chloride in the alum melt, adding thereto substantially anhydrous seeds of a solidified melt, comprising a mixture of alum and sodium chloride, said seeds containing sodium chloride in the same ratio to the alum as the melt to which they are added, dehydrating the mixture thus formed, and calcining the dehydrated product to a point short of incipient fusion to form alumina.

5. A method for obtaining alumina from a potassium alum, which includes forming a melt of the alum hydrate, dispersing sodium sulphate in the alum melt, adding thereto substantially anhydrous seeds of a solidified melt comprising a mixture of alum and sodium sulphate, said seeds containing sodium sulphate in the same ratio to the alum as the melt to which they are added, dehydrating the mixture thus formed, and calcining the dehydrated product to a point short of incipient fusion to form alumina.

6. A method of obtaining alumina from a potassium alum, which includes forming a melt of the alum hydrate, dispersing sodium borate in the alum melt, adding thereto substantially anhydrous seeds of a solidified melt, comprising a mixture of alum and sodium borate, said seeds containing sodium borate in the same ratio to the alum as the melt to which they are added, dehydrating the mixture thus formed, and calcining the dehydrated product to a point short of incipient fusion to form alumina.

7. A method for obtaining alumina from normal potassium alum, which comprises heating a quantity of the alum to between 90° C. and 200° C. to form a melt, adding to the melt at least 1% of a water-soluble inorganic sodium salt, stirring the mixture until the sodium salt has completely dispersed, further heating the mixture to cause it to thicken, cooling to solidify and drying the solid, forming approximately —20-mesh size to produce alum-sodium salt seeds, heating another quantity of the alum to between 90% C. and 200° C. to produce a melt, adding to said melt approximately 1% of a water-soluble inorganic sodium salt based upon the alumina content of the alum, stirring the mixture until the salt has completely dispersed, adding a quantity of the alum-sodium salt seeds to prevent frothing and puffing during dehydration, cooling to solidify and drying at about 200° C. calcining the dried solid approximately 1 hour at about 1000° C., and leaching the calcined material with hot water to obtain alumina of low potassium content.

HENRY A. PRAY.
CHARLES L. FAUST.
FREDERIC C. JELEN.

REFERENCES CITED

The following references are of record in the file of this patent:

UNITED STATES PATENTS

| Number | Name | Date |
|---|---|---|
| 1,263,708 | Saunders et al. | Apr. 23, 1918 |
| 1,301,394 | Cross | Apr. 22, 1919 |
| 2,043,743 | Frary | June 9, 1936 |